US 6,862,967 B2

(12) United States Patent
Sonzogni

(10) Patent No.: US 6,862,967 B2
(45) Date of Patent: Mar. 8, 2005

(54) BORING UNIT FOR COMPLEX PARTS, PARTICULARLY FOR DOOR HANDLES, WITH DIFFERENTIAL CONTROL SYSTEMS

(75) Inventor: Stefano Sonzogni, Valnegra (IT)

(73) Assignee: MEI S.r.l., Presezzo (IT)

( * ) Notice: Subject to any disclaimer, the term of this patent is extended or adjusted under 35 U.S.C. 154(b) by 56 days.

(21) Appl. No.: 10/616,789

(22) Filed: Jul. 10, 2003

(65) Prior Publication Data

US 2004/0011166 A1 Jan. 22, 2004

(30) Foreign Application Priority Data

Jul. 12, 2002 (IT) .................................... PD 2002A0193

(51) Int. Cl.[7] ................................................ B23B 3/04
(52) U.S. Cl. ............................ 82/123; 82/130; 82/70.2; 82/138
(58) Field of Search .............................. 82/46, 59, 123, 82/70.2, 138, 117, 905, 81, 72, 101, 103; 29/50

(56) References Cited

U.S. PATENT DOCUMENTS

| 4,430,913 A | * | 2/1984 | Williamson | 82/70.2 |
| 4,706,351 A | * | 11/1987 | Chuang | 29/39 |
| 6,772,659 B2 | * | 8/2004 | Antoni et al. | 82/130 |

* cited by examiner

*Primary Examiner*—Willmon Fridie, Jr.
(74) *Attorney, Agent, or Firm*—Harrison & Egbert

(57) ABSTRACT

The invention is a new boring unit for complex parts, including a fixing pin, suitable for holding the piece in its hole, and two concentric cylinders coaxial with the pin that are set rotating in the same direction by two electric motors. The inner cylinder is provided, at its end facing the grip of the pin, with a conical toothing, and the outer cylinder is provided, at its end facing the grip of the pin, with a tool-holder with radial translation mechanisms of the tools and a bevel gear wheel meshing with the conical toothing of the inner cylinder and connected with the radial translation mechanism of the tools. The radial translation of the tools is obtained by rotating the cylinders at different speeds by means of the electric motors, that is, by generating a relative motion between them.

5 Claims, 2 Drawing Sheets

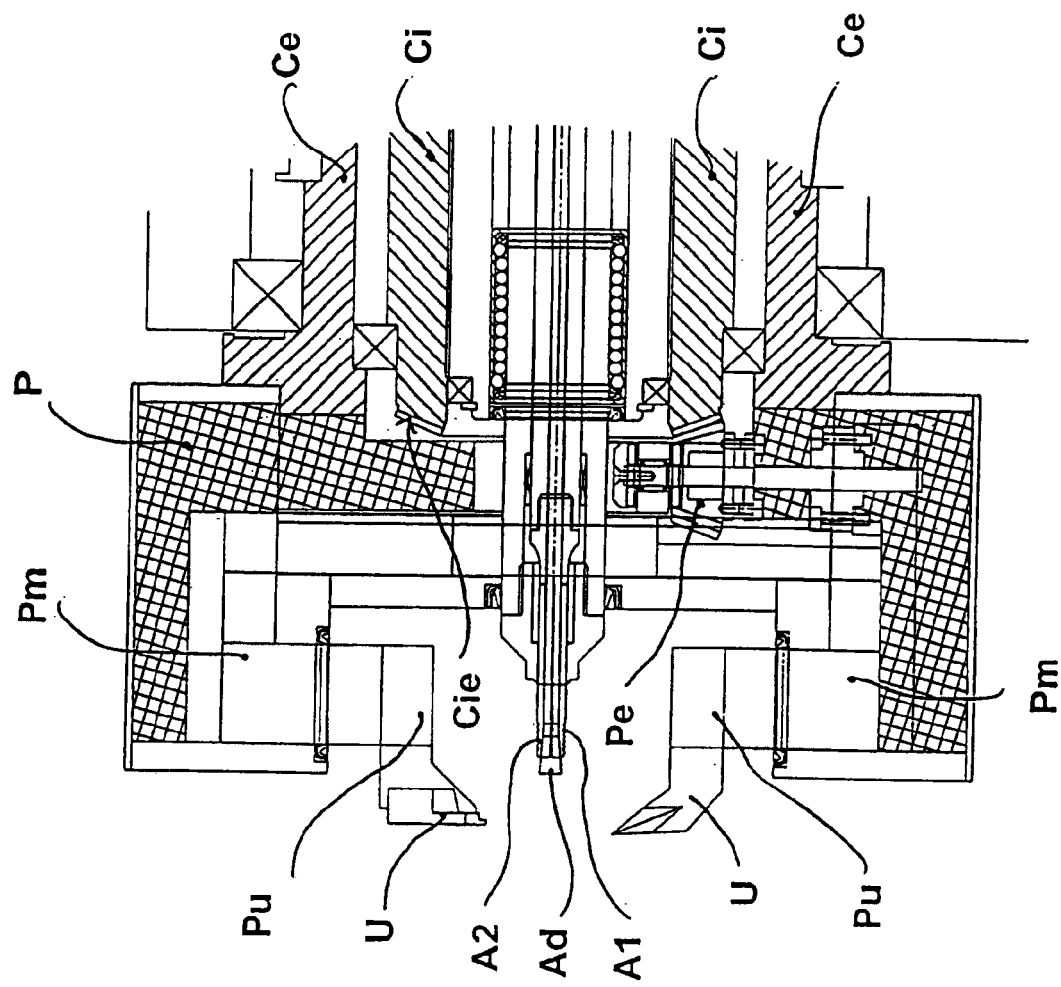
Figure 2
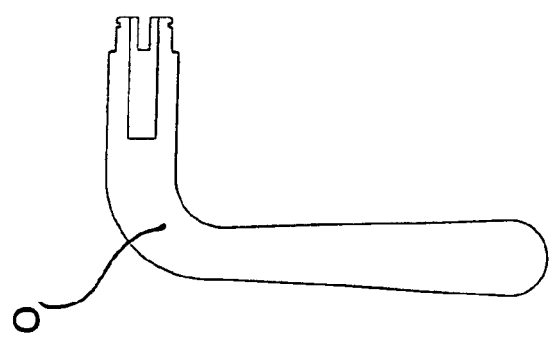

BORING UNIT FOR COMPLEX PARTS, PARTICULARLY FOR DOOR HANDLES, WITH DIFFERENTIAL CONTROL SYSTEMS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention concerns boring machines for complex parts, and in particular it concerns a new boring unit for complex parts, particularly door handles, provided with a differential control system for the rotary tools.

BACKGROUND OF THE INVENTION

The boring machines currently used comprise a piece-holding spindle, a tailstock, one or more tools.

The piece to be worked is positioned on the piece-holding spindle and locked onto it. The piece-holding spindle is set rotating and the tool is guided on the surface of the piece to be worked, in such a way as to shape it.

The boring machines used at present have a series of drawbacks:

they do not allow part of the outer surface of complex pieces to be worked, due to the fact that it is difficult for the tool to reach some areas of the object;

they do not allow complex or asymmetrical parts to be worked, since the unbalance of the mass of the object to be processed set rotating causes the oscillation of the piece-holding spindle and of the tailstock, which results in the imprecise working of its surface;

some time is necessary to accurately position the piece to be worked.

These problems arise in particular in the production of door handles, especially when it is necessary to bore the end of the handle that will be connected to the door.

In fact, both the surface decorative working and the carrying out of precise grooves at the connection end of the handles are particularly difficult due to the presence and to the mass of the handle grip.

To overcome all the drawbacks described above a new boring unit for complex parts, in particular for door handles, with differential control systems has been designed and implemented.

The main aim of the new boring unit is to allow the working of one end of eccentric or asymmetrical parts.

Another aim of the new boring unit is to allow the boring of the connection end of handles.

A further aim of the new boring unit is to ensure the rapid and correct positioning of each piece to be bored.

A further aim of the new boring unit is to ensure the boring of any piece, symmetrical or asymmetrical, with no need to rotate it.

Another aim of the new boring unit is to allow the tools to be rotated on the object to be bored.

BRIEF SUMMARY OF THE INVENTION

These and other direct and complementary aims have been achieved through the implementation of the new boring unit for complex parts, in particular for door handles, with differential control systems, comprising a square pin for fixing the piece, two concentric rotary cylinders that are also concentric with the square pin, a tool-holder applied to the outer cylinder, a bevel gear pair between the inner cylinder and the tool radial translation mechanisms.

The fixing pin is preferably a square traction pin that receives and locks the piece by holding it through its central square hole.

The two coaxial cylinders are set rotating by two separate electric motors. The outer cylinder rotates the tool-holder and the tools around the end of the handle to be bored. The rotation speed of the inner cylinder is differentiated, increased or decreased, compared to the rotation speed of the outer cylinder, so that the bevel gear pair, due to the difference in the rotation speed, operates the radial translation mechanisms of the tools.

In this way, by making the square traction pin travel coaxially, the boring is carried out along the connection end of the handle.

The characteristics of the new boring unit for complex parts, in particular for door handles, with differential control systems will be highlighted in greater detail in the following description of one among many possible applications of the invention, with reference to the attached drawings.

BRIEF DESCRIPTION OF THE VIEW OF THE DRAWING

FIG. 2 is a detailed sectional view of the boring unit of the present invention.

DETAILED DESCRIPTION OF THE INVENTION

Figure 1:
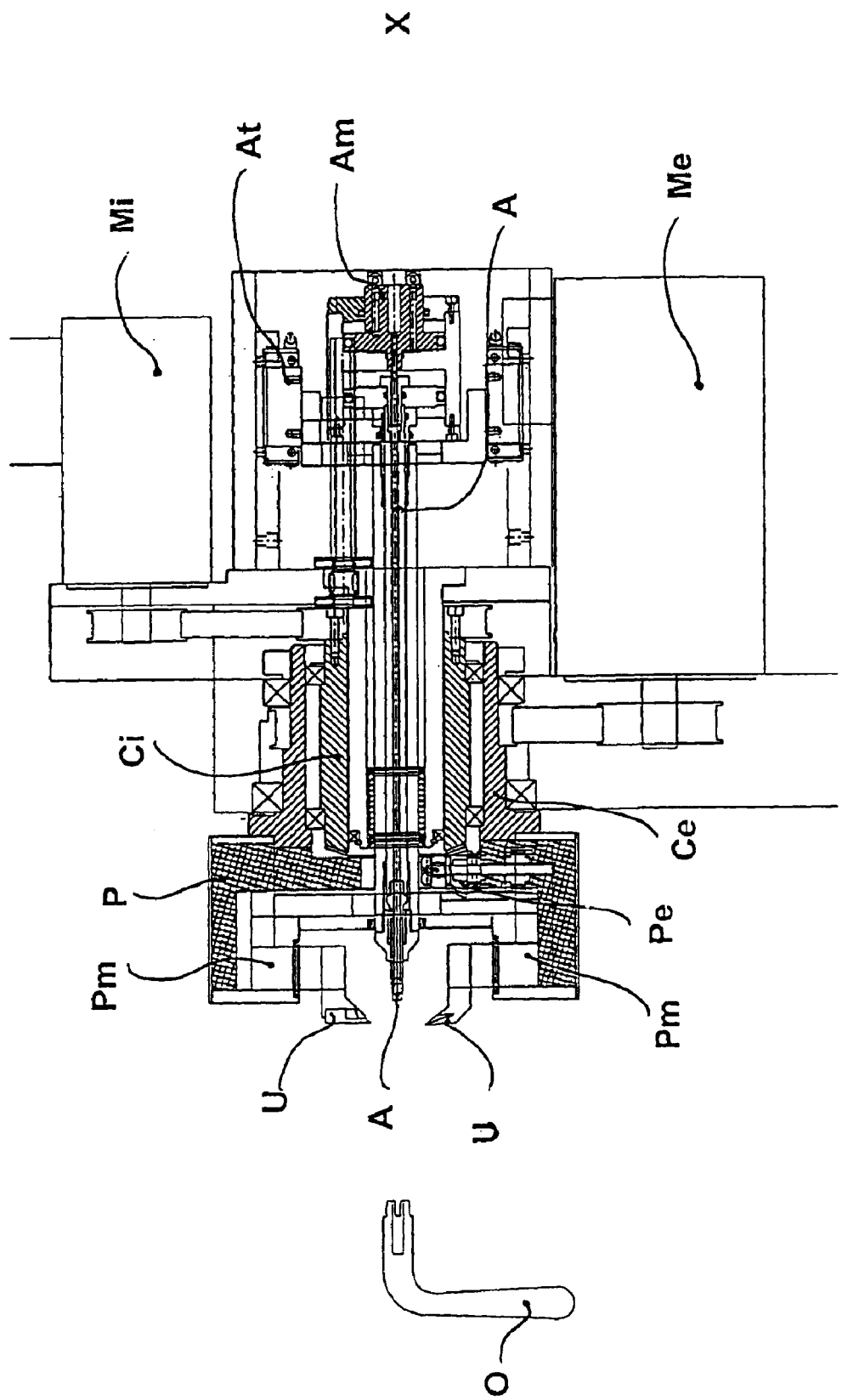
FIG. 1 is a sectional view of the boring unit of the present invention.

FIGS. 1 and 2 respectively show a general cross section and a detailed cross section of the new boring unit for complex pieces, in particular for door handles, with differential control systems, comprising a square traction pin (A), two rotary cylinders (Ci, Ce) concentric with each other and with the square pin (A), a tool holder (P) applied to the outer cylinder (Ce) and equipped with radial translation mechanisms (Pm) of the tools (U), a bevel gear pair (Pe, Cie) between the inner cylinder (Ci) and the radial translation mechanisms (Pm) of the tools (U), two motors (Mi, Me) for the rotation of the two concentric cylinders (Ci, Ce).

The square traction pin (A) is a pin with square cross section, similar to and slightly smaller than a classic square pin used to connect the two handles on the two sides of a door, whose end (Ae) may be expanded.

At the opposite end of said square traction pin (A) there are the expansion mechanism (Am) of the end (Ae) of the square pin (A) and the axial translation mechanism (At) of the whole square traction pin (A).

Said square traction pin (A) isn't set rotating by any motor and its axial rotation is preferably locked. Consequently the piece, that is, the handle (O), held by the end of said square pin (A) doesn't turn.

The two rotary cylinders (Ci, Ce) are coaxially positioned around the square traction pin (A).

Each one of the two cylinders (Ci, Ce) is connected with an electric motor (Mi, Me) on the side of the axial translation mechanism (At) of the square pin (A).

Said electric motors (Mi, Me) make said two cylinders (Ci, Ce) rotate in the same direction and they may have the same or different rotation speed.

The inner cylinder (Ci) is provided with a conical toothing (Cie) at its end opposite the motor.

The outer cylinder (Ce) supports, at its end opposite the motor (Me), the tool-holder (P). Said tool-holder (P) is integrally connected with the cylinder (Ce), so that the rotation of the cylinder (Ce) itself sets rotating also the tool-holder (P) and the tools (U) themselves.

The tool-holder (P) comprises suitable couplings (Pu) for the tools (U), suitable radial translation mechanisms (Pm) of said couplings (Pu) and a bevel gear wheel (Pe).

The couplings (Pu) of the tools (U) are preferably two and are arranged radially opposite each other, in such a way as to direct the tools (U) towards the rotation center.

Both the couplings (Pu) of the tools (U) and the tools (U) themselves are preferably L or Z-shaped, so as to allow the boring process to be carried out, that is, to ensure the action of the tools (U) in a concentric area outside the tool-holder (P) on the side opposite the outer cylinder (Ce).

The bevel gear wheel (Pe) meshes with the conical toothing (Cie) of the inner cylinder (Ci) and is connected with the radial translation mechanisms (Pm) of the couplings (Pu) of the tools (U).

The arrangement of the square traction pin (A) and of the coaxial cylinders (Ci, Ce) is such that the expansion end (Ae) is positioned between the tools (U) supported by the tool-holder (P) of the outer cylinder (Ce).

The motion of both electric motors (Mi, Me), the locking and translation of the square traction pin (A) are controlled by means of a suitable electronic circuit (X) that can be programmed or set and controlled manually.

Said electronic circuit (X) reads the instantaneous positions and the speeds of both motors (Mi, Me) of the rotary cylinders (Ci, Ce), calculates the relative position of the tool-holder (P) according to the relative positions of the two motors (Mi, Me) and controls them so that, though rotating, they remain synchronized, thus ensuring also the controlled shifting according to a precise movement diagram that corresponds to the working path.

The assembly of the two cylinders (Ce, Ci) and of the bevel gear wheel (Pe), which meshes with the conical toothing (Cie) of the inner cylinder, constitutes the differential control system of the advance of the tools (U):

- when the rotation speed of the two cylinders (Ci, Ce) is identical, there is no relative motion between said two cylinders (Ci, Ce), the bevel gear wheel (Pe) rotates together with the two cylinders (Ci, Ce), but does not rotate around its center and consequently no motion is transmitted to the radial translation mechanisms (Pm) of the tools (U);
- when the rotation speed of the two cylinders (Ci, Ce) is different, there is a relative rotation between said two cylinders (Ci, Ce); consequently, the bevel gear pair (Pe), beside rotating around the inner cylinder (Ci) together with the outer cylinder (Ce), also rotates around its own axis, thus operating the axial translation mechanisms (Pm) of the tool couplings (Pu) and of the tools (U) themselves.

In this way, by changing the rotation speed of the two cylinders (Ce, Ci), it is possible to obtain the radial shifting of the tools (U).

By making the square traction pin (A) travel axially, it is possible to bore the object, that is, the handle (O), hold by the pin (A) for the desired length.

The operation of the new boring unit for complex parts, in particular for door handles, with differential control systems is simple and rapid.

To bore a piece, it is sufficient to apply it to the expansion end (Ae) of the square traction pin (A) that provides for locking it.

Successively, the motors (Mi, Me) and the axial translation mechanism (Am) of the square pin (A) are operated. The combination of the rotation speeds of the two motors (Mi, Me), that is, of the two cylinders (Ci, Ce) and of the advance speed of the square pin (A) makes it possible to carry out the desired, controlled or programmed boring operation.

At the end of the boring operation the motors (Mi, Me) are stopped and the square pin (A) releases the object, that is, the handle (O), perfectly bored.

The new boring unit for complex parts, in particular for door handles, with differential control system, offers several advantages:

- it is possible to bore complex parts, in particular handles, which due to their shape and/or mass distribution would be difficult to bore with the boring machines currently used;
- it is possible to bore the terminal part of each piece with no need to use tailstocks or expensive special supports;
- the positioning of the objects to be bored, in particular handles, is rapid and precise;
- since the object to be bored isn't rotated, but the tools are rotated around the object, it is possible to obtain the perfect boring of any eccentric or asymmetrical piece.

Therefore, with reference to the above description and to the enclosed drawings, the following claims are put forth.

I claim:

1. Boring unit for complex parts, said boring unit comprising:

a fixing pin suitable for holding a piece in a hole of the pin, and two concentric cylinders coaxial with said pin, which are set rotating in the same direction by two electric motors, and wherein an inner cylinder is provided, at its end facing a grip of the pin, with a conical toothing, and wherein an outer cylinder is provided, at its end facing the grip of the pin, with a tool-holder with radial translation means of tools and with a bevel gear wheel meshing with the conical toothing of the inner cylinder and connected with the radial translation mechanism of the tools.

2. Boring unit for complex parts according to claim 1, wherein said radial translation of the tools is obtained by rotating said cylinders at different speeds by means of electric motors, that is, by generating a relative motion between them, and consequently the bevel gear wheel of the tool-holder meshing with the conical toothing of the inner cylinder rotates on its own axis, thus operating said radial translation mechanisms of the tools.

3. Boring unit for complex parts, in particular for door handles, according to claim 1, wherein said grip of the traction pin is square and can be expanded, and wherein at the opposite end of said traction pin the pin further comprises a mechanism that expands the grip and a mechanism that causes axial translation of the whole traction pin, and wherein said grip of the traction pin is positioned at a center of the tool-holder of said outer cylinder.

4. Boring unit for complex parts, in particular for door handles, according to claim 1, wherein said tool-holder and the tools and/or the couplings of the tools are L or Z-shaped, in such a way as to ensure the boring, that is, the action of the tools themselves, in a concentric area outside the tool-holder on the side opposite the outer cylinder.

5. Boring unit for complex parts, in particular for door handles, according to claim 1, further comprising: an electronic circuit, that can be programmed, set or controlled manually, which controls the motion of both the electric motors, the locking and the translation of the square traction pin, and wherein said electronic circuit reads instantaneous positions and speeds of both motors of the rotary cylinders, calculates relative position of the tool-holder according to the relative positions of the two motors and provides for controlling them so that, though rotating, they remain synchronized and allow also the controlled shifting according to a precise movement diagram that corresponds to the working path.

* * * * *